(No Model.)
E. E. STONE.
ANIMAL SHEARS.
No. 299,034. Patented May 20, 1884.
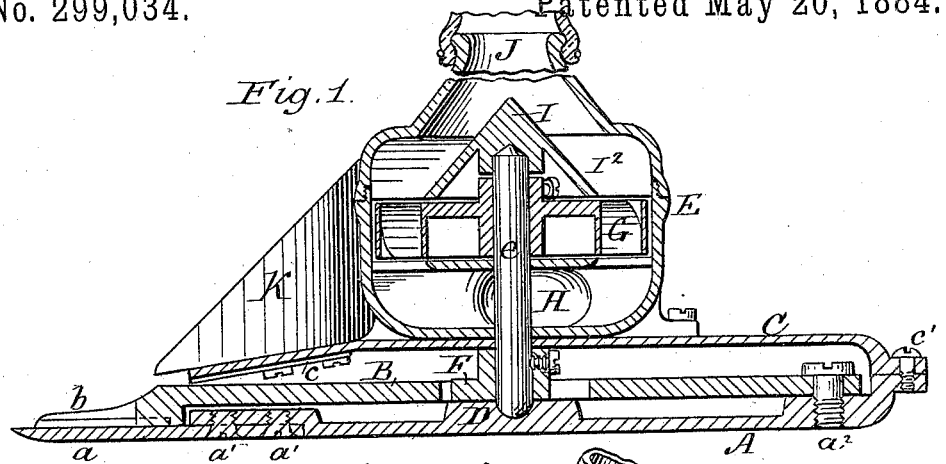
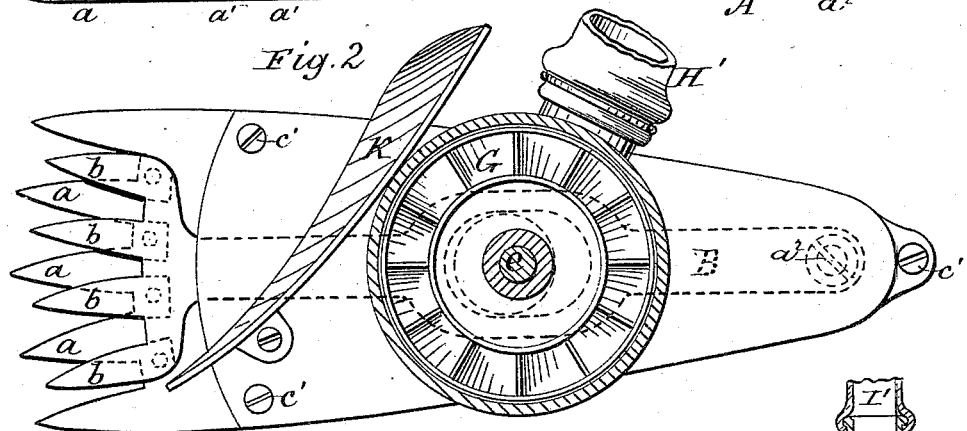
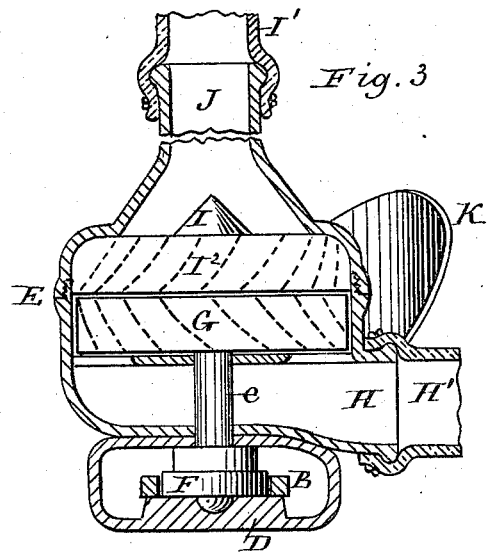
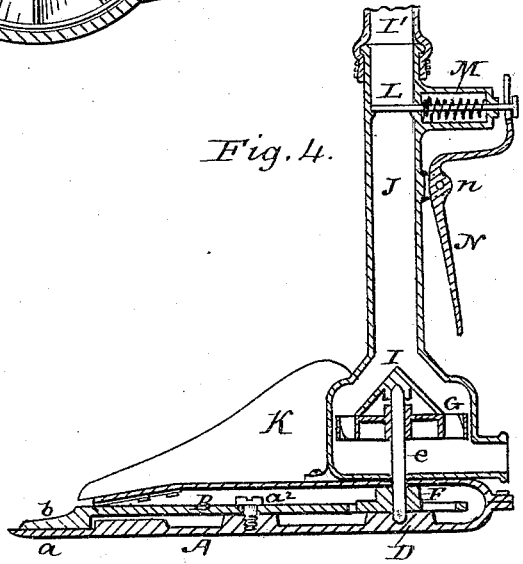
Witnesses:
L. C. Hills
W. B. Masson
Inventor:
Edward E. Stone
by E. E. Masson
atty.

UNITED STATES PATENT OFFICE.

EDWARD E. STONE, OF WASHINGTON, DISTRICT OF COLUMBIA.

ANIMAL-SHEARS.

SPECIFICATION forming part of Letters Patent No. 299,034, dated May 20, 1884.

Application filed February 1, 1884. (No model.)

*To all whom it may concern:*

Be it known that I, EDWARD E. STONE, a citizen of the United States, residing at Washington, in the District of Columbia, have invented certain new and useful Improvements in Animal-Shears, of which the following is a specification, reference being had therein to the accompanying drawings, in which—

Figure 1 is a central longitudinal vertical section, Fig. 2 a plan, Fig. 3 a transverse section, and Fig. 4 a modification, of animal-shears constructed in accordance with my invention.

Like letters indicate like parts in all the figures.

The object of my invention is to adapt ordinary clipping or animal shears to be operated by water-power; and the construction and manner of operation of the same will hereinafter be fully described, and its novel features specifically set forth in the claims.

A represents the lower portion of any ordinary shear-case, having the fixed blades $a$ formed on or secured thereto by screws $a'$. At the opposite end of said portion of the case is a pivot or screw, $a^2$, for the connection of the lever carrying the blades $b$, said lever and blades constituting the movable shear B. The lever is apertured for the reception and operation of means hereinafter described for the oscillation of the shear B about or upon the pivot $a^2$ and over the blades $a$, against which the shear B is held by means of any suitable devices, as the adjustable wedge or plate $c$. C is a cover secured to the lower portion, A, of the case by screws $c'$ or otherwise.

As thus far described the parts are substantially old, and may be of any desired shape, construction, and configuration.

To adapt the shear to be operated by water-power, I form a step, D, for the shaft $e$ of a water-motor, E, either at about the center lengthwise and transversely, as shown in Figs. 1, 2, and 3, or it may be at one end, as shown in Fig. 4, in which case the pivot $a^2$ is located centrally. In both constructions I secure to the shaft $e$ a cam, F, adapted to enter the aperture formed in the lever or shear B, and when rotated to cause it to oscillate, as above stated. The case of the motor is divided, and the lower section is secured in any suitable manner to, or it may be formed in one piece with, the cover C, and, like the cover C, is provided with an opening, through which passes the shaft $e$.

G represents the water-wheel proper, and it is secured firmly to the shaft $e$. The lower section of the motor-case is provided with an exit, H, to which may be connected in any suitable manner a discharge-pipe, H'. The upper portion of the motor-case is provided with a centrally-located bearing, I, for the shaft $e$, and an inlet, J, to which any suitable and preferably flexible supply-pipe, I', may be connected. The bearing I is preferably cone-shaped, to offer as little resistance as possible to the flow and pressure of the water.

As thus far described, it will be seen that water entering at the top is directed by the curved blades $I^2$, forming a part of the bearing I, and passes against the buckets of the wheel, and causes it, with the shaft and the cam, to rotate, and thus the shear B is oscillated across and upon the fixed blade, and the instrument is capable of its intended use.

To facilitate the laying aside or separation of the severed wool or hair, I provide a curved guide or plate, K, secured to the cover C, as shown.

I may, if desired, extend the inlet integrally or by a rigid supply-pipe and provide said extension with a valve or gate, L, so that the motor may be stopped and started at will by closing and opening said valve or gate. In Fig. 4 I have illustrated such a modified construction, and have provided the valve or gate stem L' with a spring, M, which acts to normally hold the gate in a closed position; but by means of the lever N, pivoted at $n$ to the pipe-extension, I may, by grasping said lever and extension as a handle, open the gate or valve and cause the motor to operate, and by means of the handle-like extension guide and control the implement.

As before indicated, I do not limit myself to the exact form of casing, fixed and movable shears, curved guide, or extension of the inlet, as the motor may be applied to shears where two or more sets of blades are oscillated, and in such case I may increase the number of cams upon the shaft $e$; and it is apparent that I may dispense with the curved guide shown or substitute others, and I may otherwise vary the construction herein shown to any extent and in any manner within the province of mechanical skill without a departure from my invention.

Having described the construction and operation of my invention, what I claim as new, and desire to secure by Letters Patent, is—

1. An animal-shear provided with a curved guide secured to the casing, substantially as specified.

2. The combination of the case A C, having step D, shear B, cam F, shaft $e$, and a water-motor secured to said shaft, substantially as shown and described.

In testimony whereof I affix my signature in presence of two witnesses.

EDWARD E. STONE.

Witnesses:
E. E. MASSON,
L. C. HILLS.